No. 682,865. Patented Sept. 17, 1901.
W. H. WRIGHT.
APPARATUS FOR TREATING FOOD PRODUCTS.
(Application filed June 19, 1898.)
(No Model.)
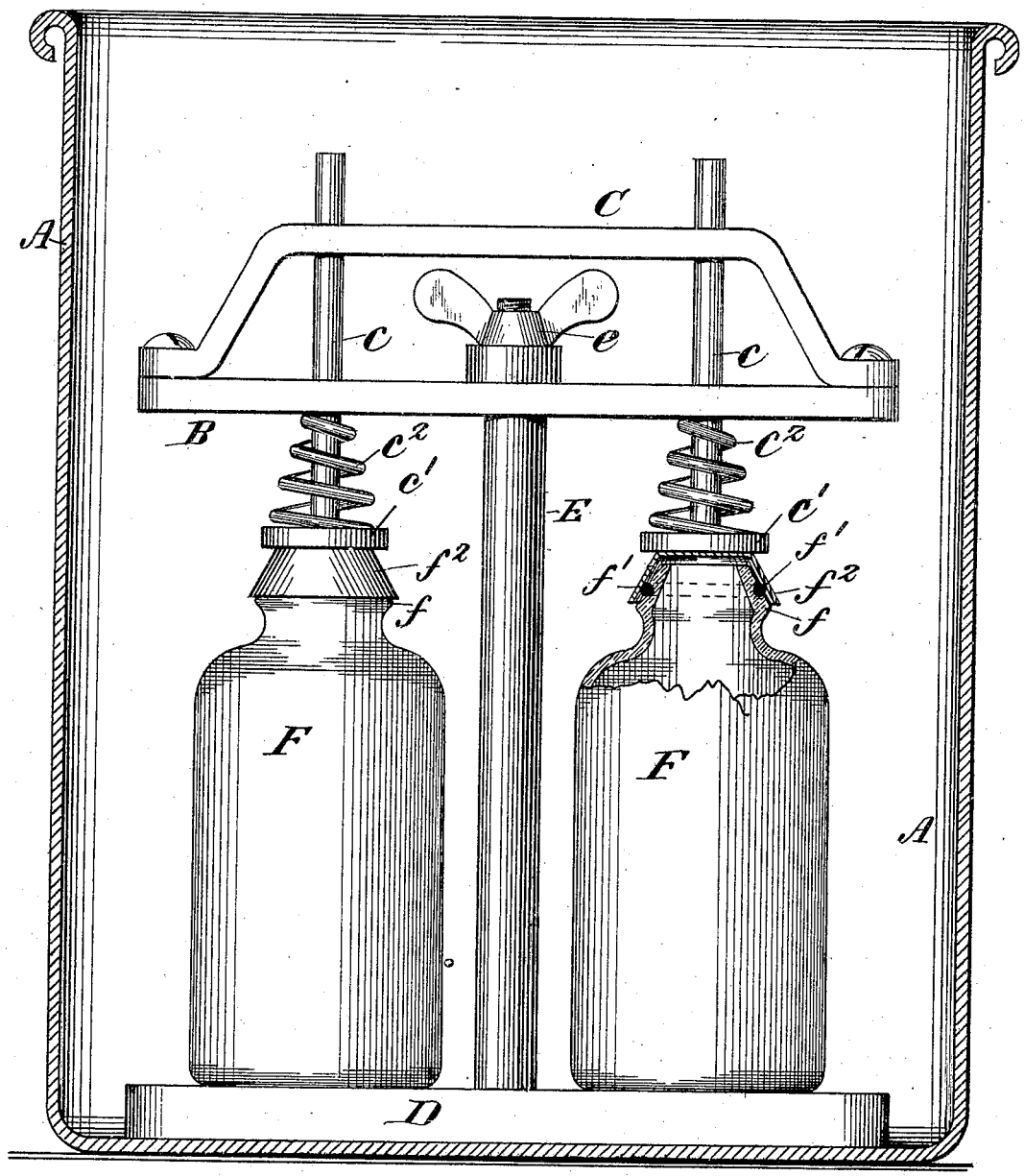
WITNESSES:
INVENTOR
William H. Wright
BY
his ATTORNEY

UNITED STATES PATENT OFFICE.

WILLIAM H. WRIGHT, OF NEW YORK, N. Y., ASSIGNOR TO THE VACUUM CAN & JAR COMPANY, OF SAME PLACE.

APPARATUS FOR TREATING FOOD PRODUCTS.

SPECIFICATION forming part of Letters Patent No. 682,865, dated September 17, 1901.

Application filed June 19, 1896. Serial No. 596,200. (No model.)

*To all whom it may concern:*

Be it known that I, WILLIAM H. WRIGHT, of the city, county, and State of New York, have invented a certain new and useful Improvement in Apparatus for Treating Food Products, of which the following is a specification.

My invention refers to an apparatus for treating food products, and is intended to provide means whereby such food products may be subjected to an absolutely-determined limit of heat to destroy the germs, and also to provide for an easy, positive, and delicate valve-like action of the covers of the vessels or jars during the treating process.

The drawing represents in vertical section an apparatus embodying the principle of my invention.

Referring to the drawing in detail, A represents a vessel adapted to receive one or more racks for holding vessels or jars and also adapted to contain water or other fluid.

B represents a rack for holding vessels or jars. C is the upper movable member of such a rack, and D is the base, provided with a central vertical post E, upon which the movable member C is mounted, capable of vertical adjustment by means of thumb-screw $e$.

$c$ $c$ represent pistons carried on the movable member C and capable of reciprocal movement relatively thereto, said pistons carrying at their lower ends disks $c'$ $c'$, which are adapted to bear on the covers $f^2$ of the vessel or jar contained in the rack.

$c^2$ $c^2$ are springs for the purpose of exerting pressure upon the covers of the vessels or jars through the medium of disks $c'$ $c'$.

The rack may be constructed to contain any number of vessels or jars F, the body portion of which may be of any desired shape. To operate properly to accomplish the desired result, however, the caps or covers of the vessels or jars and the heads thereof should be of the form shown in the drawings— to wit, the head $f$ of the jar is made with circular upwardly-converging sides adapted to give a comparatively extended bearing-surface to a correspondingly-shaped cap $f'$. The head $f$ is provided with an annular groove in which is seated a ring of rubber or similar elastic material $f^2$.

In the treatment of food products by the present apparatus I place vessels or jars in a rack and adjust the movable member of the rack to a predetermined point relatively to the covers of the vessels or jars and place the rack in a receptacle, as A, and fill the same with water or other fluid to the desired height, which in some cases will cover the caps or covers of the vessels or jars. Heat is then applied to the receptacle A to raise the fluid surrounding the vessels or jars to the boiling-point. Under the influence of the heat the food products contained in the vessels or jars swell up and the air and other gases expand, thus gradually increasing the internal pressure of the vessels or jars and raising the covers against the pressure of springs $c^2$.
During this increase of the internal pressure of the vessels or jars the elastic ring $f'$ (which has been compressed by the cover) gradually resumes its normal dimensions proportionately as the cap or cover is raised until a point is reached when the cap or cover has no compressing action on the ring, which simply fills up the space between the outer surface of the head $f$ and the inner surface of the cap. Further increase of the internal pressure of the vessels or jars will raise the covers of the vessels or jars out of contact with the ring and permit of the escape of the gas from the vessels or jars, which of course will be attended with a consequent reduction in the internal pressure, so that the springs $c^2$ will immediately close the vessel.

By reason of the peculiar construction of the head and cover of the vessel or jar and the employment of the intervening elastic ring, associated and acting with a pressure-rack of substantially the character described, all the coöperating elements of which vessels or jars and rack may be so proportioned and calculated relatively to each other as to compensate for a predetermined internal pressure, a most delicate valve action is secured, the internal and external pressures on the covers or caps of the vessels or jars during the heating process being kept constantly *in equilibrio*, thus permitting of the total immersion of the vessels or jars in the heating fluid, the valve action of the caps or covers being so perfect and quick-acting that none of the surrounding fluid enters the vessels. For the same reason if the heating fluid does not reach the caps the valve action is equally effective.

What is claimed as new is—

The combination with a rarefying-receptacle, of one or more jars or vessels arranged therein, and each having an upwardly-converging head provided with an external groove, which divides the surface of the heads into two zones, an elastic ring in said groove, a cover for each of said jars having its inner surface corresponding with the convergence of the head of the jar and adapted, when pressure is applied, to distort said elastic ring, to force it into said zones, and a yielding pressure device for said covers.

In testimony whereof I have signed my name to this specification in the presence of two subscribing witnesses.

WILLIAM H. WRIGHT.

Witnesses:
ERNEST HOPKINSON,
W. LAIRD GOLDSBOROUGH.